(12) United States Patent
Xia et al.

(10) Patent No.: US 10,945,577 B2
(45) Date of Patent: Mar. 16, 2021

(54) TIMED CLEANING METHOD, DEVICE AND STORAGE MEDIUM

(71) Applicant: BEIJING XIAOMI MOBILE SOFTWARE CO., LTD., Beijing (CN)

(72) Inventors: Yongfeng Xia, Beijing (CN); Ke Wu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 243 days.

(21) Appl. No.: 16/101,366

(22) Filed: Aug. 10, 2018

(65) Prior Publication Data
US 2019/0053682 A1     Feb. 21, 2019

(30) Foreign Application Priority Data
Aug. 17, 2017 (CN) .......................... 201710708790.2

(51) Int. Cl.
    *G05D 1/02*     (2020.01)
    *A47L 11/40*     (2006.01)
    *A47L 9/28*     (2006.01)

(52) U.S. Cl.
CPC ......... *A47L 11/4011* (2013.01); *A47L 9/2826* (2013.01); *A47L 9/2852* (2013.01); *A47L 11/4061* (2013.01); *G05D 1/0219* (2013.01); *G05D 1/0238* (2013.01); *G05D 1/0274* (2013.01); *A47L 2201/04* (2013.01); *A47L 2201/06* (2013.01); *G05D 2201/0203* (2013.01)

(58) Field of Classification Search
USPC ................................................ 700/245–264
See application file for complete search history.

(56) References Cited

U.S. PATENT DOCUMENTS

| 4,674,048 A | * | 6/1987 | Okumura | B25J 9/1676 |
| | | | | 318/568.12 |
| 6,459,955 B1 | * | 10/2002 | Bartsch | A47L 9/00 |
| | | | | 700/245 |
| 9,223,749 B2 | * | 12/2015 | Chiappetta | B60L 53/38 |
| 9,420,741 B2 | * | 8/2016 | Balutis | G01S 19/13 |
| 10,335,949 B2 | * | 7/2019 | Shin | B25J 9/1689 |

(Continued)

FOREIGN PATENT DOCUMENTS

| CN | 106200645 A | 12/2016 |
| CN | 106413500 A | 2/2017 |

(Continued)

OTHER PUBLICATIONS

G. Schmidt and C. Hofner, "An advanced planning and navigation approach for autonomous cleaning robot operations," Proceedings. 1998 IEEE/RSJ International Conference on Intelligent Robots and Systems, pp. 1230-1235 vol. 2 (Year: 1998).*

(Continued)

*Primary Examiner* — Jonathan L Sample
(74) *Attorney, Agent, or Firm* — Syncoda LLC; Feng Ma

(57) ABSTRACT

A timed cleaning method includes: obtaining a topographic map of a cleaning region, wherein the topographic map identifies an obstacle in the cleaning region; based on the topographic map, determining an unclean region in the cleaning region, wherein the unclean region is occupied by the obstacle; detecting the unclean region according to a preset time interval; and if the obstacle at the unclean region is removed, cleaning the unclean region.

17 Claims, 12 Drawing Sheets

(56) References Cited

U.S. PATENT DOCUMENTS

| | | | | |
|---|---|---|---|---|
| 10,398,273 B2* | 9/2019 | Watanabe | | A47L 5/22 |
| 2002/0193908 A1* | 12/2002 | Parker | | G06N 3/008 |
| | | | | 700/258 |
| 2004/0083570 A1* | 5/2004 | Song | | A47L 9/009 |
| | | | | 15/319 |
| 2004/0204792 A1* | 10/2004 | Taylor | | A47L 9/2831 |
| | | | | 700/245 |
| 2005/0156562 A1* | 7/2005 | Cohen | | H02J 7/0026 |
| | | | | 320/107 |
| 2005/0192707 A1* | 9/2005 | Park | | G05D 1/0246 |
| | | | | 700/259 |
| 2005/0251292 A1* | 11/2005 | Casey | | G05D 1/0242 |
| | | | | 700/245 |
| 2005/0288079 A1* | 12/2005 | Tani | | G05D 1/0246 |
| | | | | 463/1 |
| 2006/0009876 A1* | 1/2006 | McNeil | | G05D 1/0297 |
| | | | | 700/245 |
| 2006/0085105 A1* | 4/2006 | Chiu | | H02J 7/0044 |
| | | | | 701/23 |
| 2006/0190133 A1* | 8/2006 | Konandreas | | A47L 11/4088 |
| | | | | 700/245 |
| 2006/0190146 A1* | 8/2006 | Morse | | A47L 11/302 |
| | | | | 701/23 |
| 2006/0235585 A1* | 10/2006 | Tanaka | | G05D 1/0246 |
| | | | | 701/23 |
| 2007/0016328 A1* | 1/2007 | Ziegler | | A47L 7/0042 |
| | | | | 700/245 |
| 2007/0192910 A1* | 8/2007 | Vu | | B25J 19/06 |
| | | | | 700/245 |
| 2007/0213892 A1* | 9/2007 | Jones | | G05D 1/0227 |
| | | | | 701/23 |
| 2008/0015738 A1* | 1/2008 | Casey | | G05D 1/0238 |
| | | | | 700/258 |
| 2008/0161969 A1* | 7/2008 | Lee | | G05D 1/0225 |
| | | | | 700/245 |
| 2008/0184518 A1* | 8/2008 | Taylor | | A47L 9/009 |
| | | | | 15/319 |
| 2010/0263142 A1* | 10/2010 | Jones | | A47L 11/00 |
| | | | | 15/21.1 |
| 2011/0202175 A1* | 8/2011 | Romanov | | B25J 5/00 |
| | | | | 700/250 |
| 2012/0169497 A1* | 7/2012 | Schnittman | | A47L 9/2894 |
| | | | | 340/540 |
| 2013/0030750 A1* | 1/2013 | Kim | | G06N 3/004 |
| | | | | 702/108 |
| 2013/0204463 A1* | 8/2013 | Chiappetta | | A47L 9/2826 |
| | | | | 701/2 |
| 2013/0206177 A1* | 8/2013 | Burlutskiy | | G05D 1/0219 |
| | | | | 134/18 |
| 2013/0221917 A1* | 8/2013 | Kulkarni | | B60L 53/31 |
| | | | | 320/109 |
| 2013/0226344 A1* | 8/2013 | Wong | | G05D 1/0242 |
| | | | | 700/258 |
| 2014/0129027 A1* | 5/2014 | Schnittman | | G05D 1/0227 |
| | | | | 700/253 |
| 2014/0207280 A1* | 7/2014 | Duffley | | G05D 1/0016 |
| | | | | 700/257 |
| 2014/0207282 A1* | 7/2014 | Angle | | H04L 67/125 |
| | | | | 700/257 |
| 2014/0222197 A1* | 8/2014 | Letsky | | G05D 1/0274 |
| | | | | 700/245 |
| 2014/0288709 A1* | 9/2014 | Sim | | B25J 9/0003 |
| | | | | 700/259 |
| 2016/0027207 A1* | 1/2016 | Hillen | | G06T 17/00 |
| | | | | 348/207.1 |
| 2016/0144505 A1* | 5/2016 | Fong | | B25J 9/1697 |
| | | | | 700/250 |
| 2016/0259341 A1* | 9/2016 | High | | G05B 19/048 |
| 2017/0203439 A1* | 7/2017 | Shin | | G05D 1/0219 |
| 2017/0235312 A1* | 8/2017 | Yoshino | | A47L 11/4008 |
| | | | | 700/258 |
| 2017/0312916 A1* | 11/2017 | Williams | | G01C 21/206 |
| 2017/0329347 A1* | 11/2017 | Passot | | G05D 1/0088 |
| 2018/0055312 A1* | 3/2018 | Jung | | B25J 19/023 |
| 2018/0304463 A1* | 10/2018 | Wolowelsky | | B25J 5/00 |
| 2018/0344116 A1* | 12/2018 | Schriesheim | | A47L 9/2857 |

FOREIGN PATENT DOCUMENTS

| | | |
|---|---|---|
| CN | 106527438 A | 3/2017 |
| CN | 106821157 A | 6/2017 |
| CN | 106998981 A | 8/2017 |
| JP | 2748281 B2 | 5/1998 |
| WO | 2013118974 A1 | 8/2013 |
| WO | 2017079777 A2 | 5/2017 |

OTHER PUBLICATIONS

"An Advanced Planning and Navigation Approach for Autonomous Cleaning Robot Operations", cited in extended European search report of European Patent Application No. 18189507.9, from the European Patent office, dated Jan. 25, 2019.

Extended European search report of European Patent Application No. 18189507.9, from the European Patent office, dated Jan. 25, 2019.

First Office Action of Chinese Patent Application No. 201710708790. 2, from the Chinese Patent office, dated Aug. 30, 2019.

Second Office Action of Chinese Patent Application No. 201710708790. 2, dated May 18, 2020.

* cited by examiner

TIMED CLEANING METHOD, DEVICE AND STORAGE MEDIUM

CROSS-REFERENCE TO RELATED APPLICATION

This application claims the priority to Chinese patent application No. 201710708790.2 filed on Aug. 17, 2017, the disclosure of which is hereby incorporated by reference in its entirety.

BACKGROUND

With the rapid technology advances, more and more smart appliances have entered households, and greatly improved comfort and convenience of users' daily lives. For example, to reduce the workload of cleaning household rooms or office spaces, more and more users choose to use cleaning robots.

To avoid obstacles such as furniture in a room, a cleaning robot may scan a region to be cleaned by means of infrared (IR), ultrasonic or other means to obtain information about obstacles that exist in a cleaning path. When the cleaning robot encounters the obstacles in the process of cleaning the room, the cleaning robot may turn automatically to avoid collisions with the obstacles in the process of cleaning.

SUMMARY

In a first aspect, a timed cleaning method is provided, comprising: obtaining a topographic map of a cleaning region, wherein the topographic map identifies an obstacle in the cleaning region; based on the topographic map, determining an unclean region in the cleaning region, wherein the unclean region is occupied by the obstacle; detecting the unclean region according to a preset time interval; and if the obstacle at the unclean region is removed, cleaning the unclean region.

In some embodiments, the method further includes: determining whether the obstacle is temporary based on a bottom area of the obstacle; wherein the detecting the unclean region according to the preset time interval comprises: if the obstacle is temporary, detecting the unclean region according to the preset time interval.

In some embodiments, wherein the determining whether the obstacle is temporary furniture based on the bottom area of the obstacle includes: determining whether or not the bottom area of the obstacle is smaller than or equal to a preset area threshold; and if the bottom area of the obstacle is smaller than or equal to the preset area threshold, confirming the obstacle as the temporary.

In some embodiments, wherein the determining whether the obstacle is temporary based on the bottom area of the obstacle includes: obtaining information about the obstacle according to the bottom area of the obstacle; and determining an attribute of the obstacle according to a correspondence relationship between obstacles and obstacle attributes, wherein the obstacle attributes indicate whether the obstacles are temporary or fixed.

In some embodiments, the method further includes: after the unclean region has been cleaned, marking the unclean region as a cleaned region.

In another aspect, a timed cleaning device is provided, including: a processor, and a memory device configured to store a set of instructions executable by the processor, wherein the processor is configured, based on the instructions, to: obtain a topographic map of a cleaning region, where the topographic map identifies an obstacle in the cleaning region; based on the topographic map, determine an unclean region in the cleaning region, wherein the unclean region is occupied by the obstacle; detect the unclean region according to a preset time interval; and if detecting that the obstacle at the unclean region is removed, clean the unclean region.

In some embodiments, the processor is further configured to: determine whether the obstacle is temporary according to a bottom area of the obstacle; and the processor is further configured such that the detecting the unclean region according to the preset time interval includes: if the obstacle is the temporary furniture, detecting the unclean region according to the preset time interval.

In some embodiments, the processor is further configured such that the determining whether the obstacle is temporary based on the bottom area of the obstacle includes: determining whether or not the bottom area of the obstacle is smaller than or equal to a preset area threshold; and if the bottom area of the obstacle is smaller than or equal to the preset area threshold, confirming the obstacle as temporary.

In some embodiments, the processor is further configured such that the determining whether the obstacle is temporary based on the bottom area of the obstacle includes: obtaining information about the obstacle according to the bottom area of the obstacle; and determining an attribute of the obstacle according to a correspondence relationship between obstacles and obstacle attributes, wherein the obstacle attributes indicate whether the obstacles are temporary or fixed.

In some embodiments, the processor is further configured to: after the unclean region has been cleaned, mark the unclean region as a cleaned region.

In another aspect, a non-transitory computer-readable storage medium having a set of computer program instructions stored thereon is provided, wherein the computer program instructions are executable by a processor to implement a method for performing a timed cleaning method, wherein the method includes: obtaining a topographic map of a cleaning region, wherein the topographic map identifies an obstacle in the cleaning region; according to the topographic map, determining an unclean region in the cleaning region, wherein the unclean region is occupied by the obstacle; detecting the unclean region according to a preset time interval; and if detecting that the obstacle at the unclean region is removed, cleaning the unclean region.

In some embodiments, the method further includes: determining whether the obstacle is temporary based on a bottom area of the obstacle; wherein the detecting the unclean region according to the preset time interval comprises: if the obstacle is temporary, detecting the unclean region according to the preset time interval.

In some embodiments, the determining whether the obstacle is temporary according to the bottom area of the obstacle includes: determining whether or not the bottom area of the obstacle is smaller than or equal to a preset area threshold; and if the bottom area of the obstacle is smaller than or equal to the preset area threshold, confirming the obstacle as temporary.

In some embodiments, the determining whether the obstacle is the temporary based on the bottom area of the obstacle includes: obtaining information about the obstacle according to the bottom area of the obstacle; and determining an attribute of the obstacle according to a correspondence relationship between obstacles and obstacle attributes, wherein the obstacle attributes indicate whether the obstacles are temporary or fixed.

It should be understood that the above general descriptions and the detailed descriptions below are only exemplary and explanatory and not intended to limit the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Various embodiments of the present disclosure relate to a cleaning robot which may be coupled with a terminal through IR, Bluetooth or wireless communication networks.

When the cleaning robot encounters an obstacle in the process of cleaning a room, the cleaning robot can turn around the obstacle to clean regions around the obstacle.

In some situations, due to a user's activity in the room, furniture such as a stool or a garbage bin may be temporarily placed on the floor. If the cleaning robot bypasses the stool or the garbage bin when encountering the stool or the garbage bin, the floor temporarily occupied by the stool or the garbage bin is unable to be cleaned, causing unsatisfactory cleaning of the room.

According to some embodiments of the present disclosure, when encountering an obstacle in a region in the process of cleaning, the region may be marked as an unclean region, and then the unclean region is explored or sensed again according to predetermined procedures, such as checked regularly. When it is determined that the obstacle is removed, the unclean region previously occupied by the obstacle is cleaned, thereby increasing flexibility in cleaning the room, ensuring the cleaning quality and improving user experience.

Figure 1A:
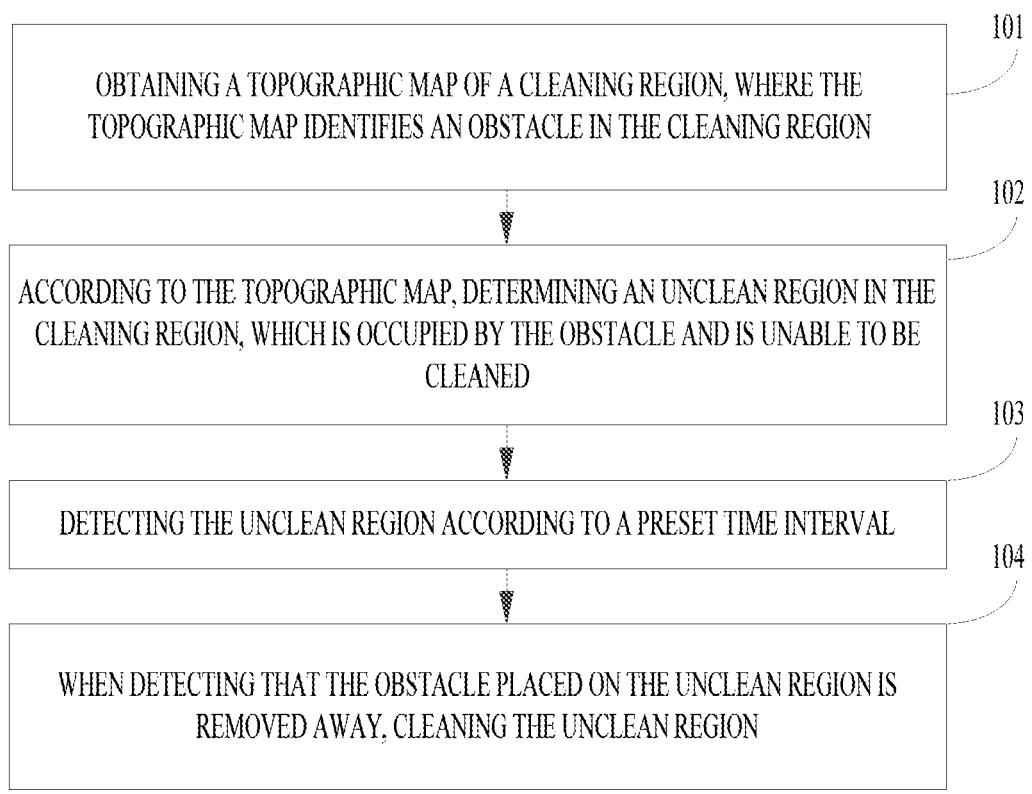
FIG. 1A is a flowchart illustrating a timed cleaning method according to some embodiments.

FIG. 1A is a flowchart illustrating a timed cleaning method according to some embodiments, and this method is applied to a cleaning robot. As shown in FIG. 1A, the timed cleaning method includes the following steps 101 to 104.

Step 101 can include obtaining a topographic map of a cleaning region, where the topographic map identifies an obstacle in the cleaning region.

For example, when the cleaning robot cleans a room, the cleaning robot may encounter several obstacles, such as an edge or a supporting portion of a piece of furniture. When detecting an obstacle, the obstacle can be marked in a topographic map of the room according to a bottom area of the obstacle. Specifically, in the process of cleaning the room, the cleaning robot may identify an encountered obstacle by means of its path obstacle avoidance function, and then scan the obstacle through a sensor mounted on the cleaning robot, to thereby determine a relative size ratio of the obstacle to the cleaning robot.

Next, according to the size of the cleaning robot, a contact area between the obstacle and the cleaning robot, e.g., the bottom area of the obstacle, may be obtained. Subsequently, the obstacle may be marked in the topographic map of the room according to the bottom area of the obstacle. The topographic map of the room can be the topographic map of the cleaning region for the cleaning robot.

Step 102 can include, according to the topographic map, determining an unclean region in the cleaning region, wherein the unclean region is occupied by the obstacle and is unable to be cleaned.

For example, after obtaining the topographic map in which an obstacle is identified, the cleaning robot may obtain information about a region which is occupied by the obstacle according to the topographic map, and then set the region as an unclean region.

When the topographic map identifies several obstacles, the region which is occupied by each of the obstacles can be set as an unclean region. In other words, information about several unclean regions can be obtained according to the topographic map, and each of the uncleaned regions may be processed according to the methods of various embodiment of the present disclosure.

In some other embodiments, after obtaining the topographic map in which several obstacles are identified, the cleaning robot may determine in turn whether or not the bottom area of each obstacle is smaller than or equal to a preset threshold, and then set a region occupied by the obstacle of which the bottom area is smaller than or equal to the preset threshold as the unclean region. The region occupied by the obstacle of which the bottom area is greater than the preset threshold is not marked.

Step 103 can include detecting, sensing, or scanning the unclean region according to a preset time interval.

For example, the preset time interval may be set in the cleaning robot, or in the terminal communicating with and/or controlling the cleaning robot. In some applications, the preset time interval may be set according to specific conditions, which is not limited herein.

After obtaining information about the unclean region, the cleaning robot may detect the unclean region at every preset time interval to determine whether the obstacle placed on the unclean region is moved away. For example, in a case that the preset time interval is 10 minutes, after obtaining information about the unclean region, the cleaning robot may move to the unclean region every 10 minutes and determine whether the obstacle placed on the unclean region is removed by means of its path obstacle avoidance function, i.e., determining whether there exists an obstacle on the unclean region by means of the path obstacle avoidance function. If not, it means that the obstacle has been removed.

When the cleaning robot obtains information about several unclean regions according to the topographic map, the cleaning robot may detect in turn the unclean regions at every preset time interval to determine whether the obstacle placed at each of the unclean regions is removed.

Step 104 can include, after determining that the obstacle placed on the unclean region is removed, cleaning the unclean region.

For example, when the cleaning robot detects that the obstacle placed on the unclean region is moved away, i.e., the cleaning robot detects no obstacle when the cleaning robot moves to the unclean region, the cleaning function of the cleaning robot may be turned on to clean the unclean region, thereby ensuring a thorough cleaning of the room.

Specifically, after the unclean region has been cleaned, the unclean region may be marked as a cleaned region, thereby avoiding detection of the unclean region again which extends working time of the cleaning robot.

According to some embodiments of the present disclosure, when encountering an obstacle in a region in the process of cleaning, the region may be marked as an unclean region, and then the unclean region is scanned or sensed regularly. When it is detected that the obstacle is removed, the unclean region occupied by the obstacle is cleaned, thereby increasing flexibility in cleaning the room, ensuring the cleaning quality and then improving user experience.

Figure 1B:
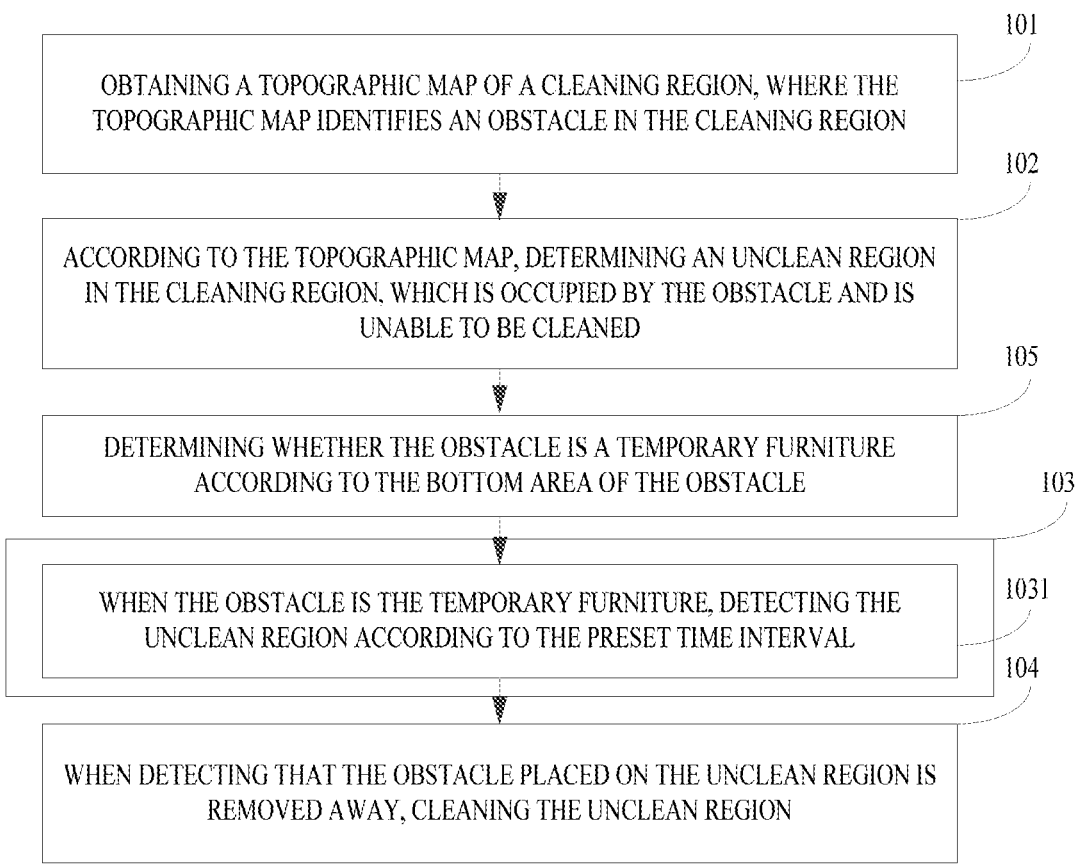
FIG. 1B is a flowchart illustrating a timed cleaning method according to some embodiments.

In some embodiments, as shown in FIG. 1B, the method further includes step 105.

Step 105 can include determining whether the obstacle is a temporary furniture according to the bottom area of the obstacle.

Step 103 of detecting the unclean region according to the preset time interval may be implemented by means of a step 1031.

Step 1031 can include, when the obstacle is a temporary furniture, scanning the unclean region according to the preset time interval.

For example, in the process that the cleaning robot cleans the room, there may be several obstacles, some of which are fixed obstacles such as an edge or a supporting portion of a large furniture, and some of which may be temporary obstacles such as a stool leg or a garbage bin.

The possibility of moving one fixed obstacle in a short time is very small, and a position of one temporary obstacle may be changed at any time depending on a user's activities in the room. Therefore, after the cleaning robot marks the region occupied by the obstacle identified in the topographic map as the unclean region, the cleaning robot may first determine whether the obstacle placed on the unclean region is a temporary furniture.

If the obstacle placed on the unclean region is a piece of temporary furniture, the cleaning robot may detect the unclean region at every preset time interval to determine whether the obstacle placed on the unclean region is removed.

After the obstacle placed on the unclean region is moved away, the cleaning robot cleans the unclean region. If the obstacle placed on the unclean region is a piece of fixed furniture, the cleaning robot may mark the unclean region as a fixed region, and then the cleaning robot may bypass the fixed region without further scanning the fixed region in the cleaning process, thereby saving cleaning resources of the cleaning robot.

If there are several unclean regions determined by the cleaning robot, the cleaning robot may determine in turn whether the obstacle placed on each unclean region is a piece of temporary furniture, and then detect in turn the unclean regions where the temporary furniture is placed according to the preset time interval. Further, the cleaning robot marks the unclean region where the fixed furniture is placed as the fixed region, thereby avoiding repeated detection.

For example, after the cleaning robot obtains the topographic map in which several obstacles are identified, the cleaning robot may send the topographic map to a terminal. After receiving the topographic map, the terminal can display the topographic map and prompt the user to view the topographic map. The user can set an attribute or property for each obstacle on the terminal according to specific conditions. For example, a furniture attribute may indicate a piece of fixed furniture or a piece of temporary furniture.

The terminal can generate attribute information according to the user's settings and send the attribute information to the cleaning robot. The attribute information includes the furniture attribute of each obstacle. The cleaning robot may determine the furniture attribute of the obstacle placed on each unclean region according to the attribute information.

According to some embodiments of the present disclosure, when encountering an obstacle in a region in the process of cleaning, the region may be marked as an unclean region, and the unclean region may be scanned regularly if the obstacle is a temporary furniture. When it is determined that the obstacle is moved away, the unclean region previously occupied by the obstacle is cleaned, thereby avoiding ineffective detection of the unclean region, increasing flexibility in cleaning the room, ensuring the cleaning quality and then improving user experience.

Figure 1C:
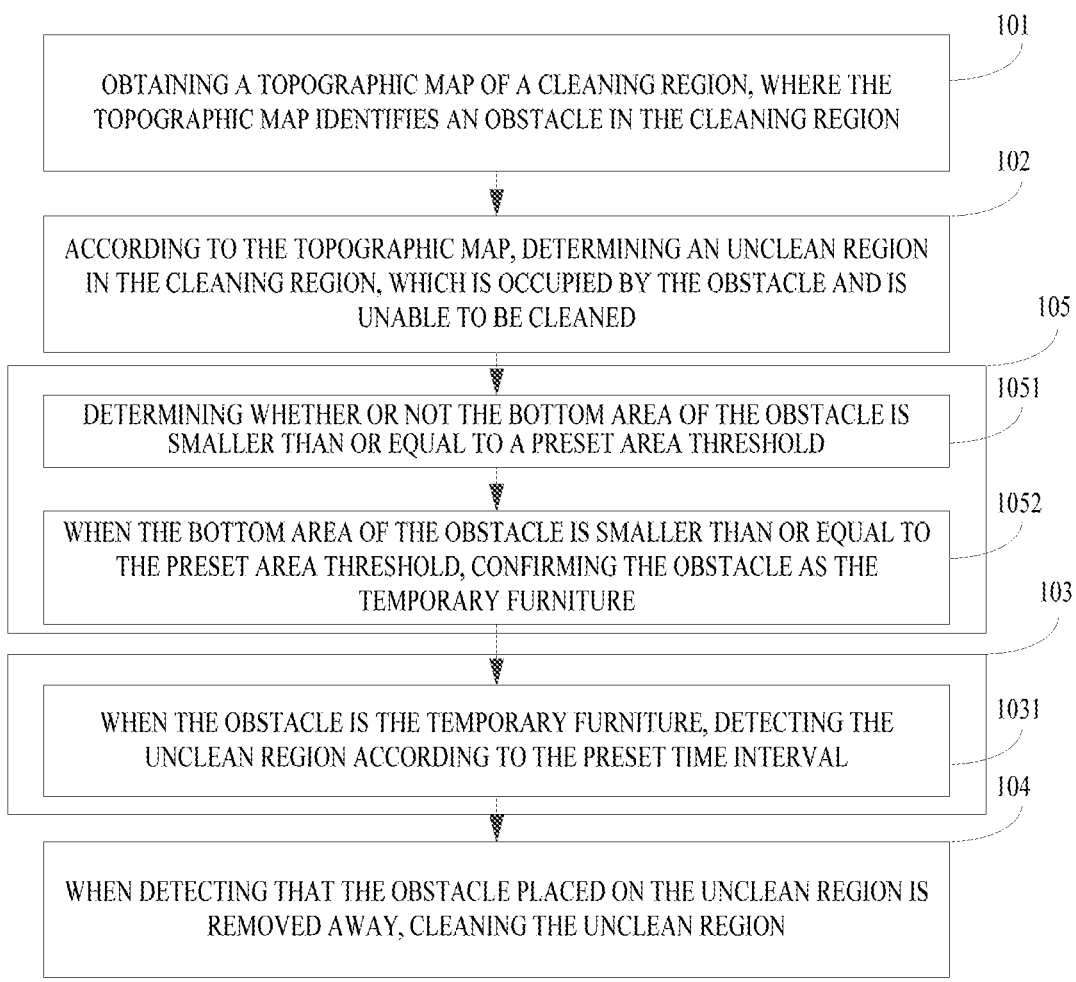
FIG. 1C is a flowchart illustrating a timed cleaning method according to some embodiments.

In some embodiments, as illustrated in FIG. 1C, step 105 of determining whether the obstacle is a piece of temporary furniture according to the bottom area of the obstacle may be implemented by means of steps 1051 and 1052.

Step 1051 can include determining whether or not the bottom area of the obstacle is smaller than or equal to a preset area threshold.

Step 1052 can include, if the bottom area of the obstacle is smaller than or equal to the preset area threshold, confirming the obstacle as the temporary furniture.

Generally, the large furniture placed in the room are substantially floor furniture having a large contact area with the ground and a small possibility of being moved; the temporary furniture has a smaller contact area with the ground and may have its position changed depending on the user's activity in the room. As such, the cleaning robot may determine whether the obstacle is a piece of temporary furniture according to the bottom area of the obstacle.

For example, when initialized, the preset area threshold may be set in advance for the cleaning robot. After determining the unclean region, the cleaning robot may first obtain the bottom area of the obstacle placed on the unclean region, i.e., the contact area between the obstacle and the ground, and determine whether or not the bottom area of the obstacle is smaller than or equal to the preset area threshold.

If the bottom area of the obstacle is smaller than or equal to the preset area threshold, it may be determined that the obstacle placed on the unclean region is a piece of temporary furniture. The cleaning robot may scan, detect, sense, probe, or explore again the unclean region at every preset time interval. After the obstacle is removed, the cleaning robot cleans the unclean region.

If the bottom area of the obstacle is greater than the preset area threshold, it may be determined that the obstacle placed on the unclean region is a piece of fixed furniture. The cleaning robot may mark the unclean region as a fixed region and ignore the fixed region in the subsequent cleaning process. In some applications, the preset area threshold may be set according to specific conditions, which is not limited herein.

Various embodiments of the present disclosure may have one or more of the following beneficial effects: the furniture attribute of the obstacle may be determined according to the size of the obstacle, thereby improving convenience and accuracy of determination of the furniture attribute.

Figure 1D:
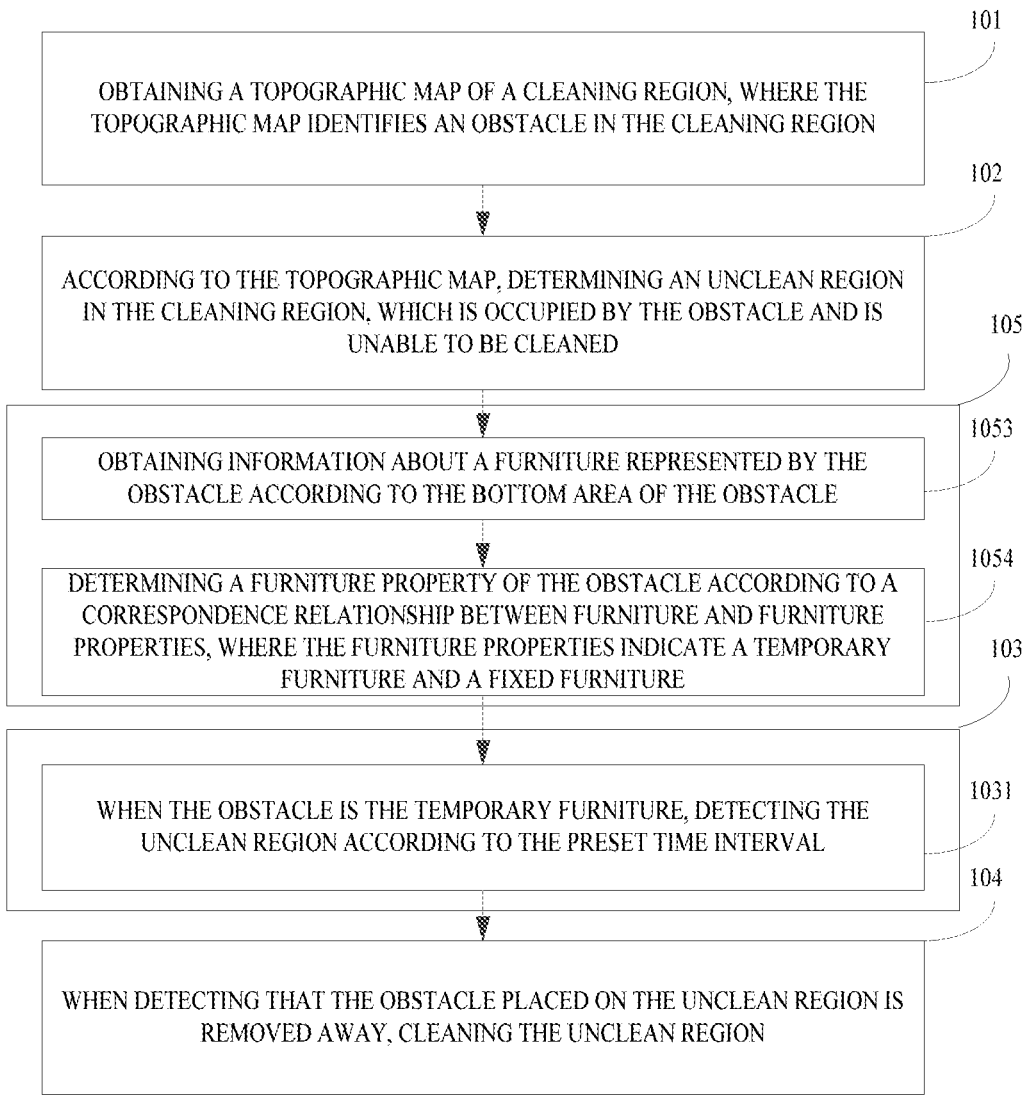
FIG. 1D is a flowchart illustrating a timed cleaning method according to some embodiments.

In some embodiments, as shown in FIG. 1D, the step 105 of determining whether the obstacle is a temporary furniture according to the bottom area of the obstacle may be implemented by means of steps 1053 and 1054.

Step 1053 can include obtaining information about a furniture represented by the obstacle according to the bottom area of the obstacle.

Step 1054 can include determining a furniture property of the obstacle according to a correspondence relationship between furniture and furniture properties/attributes, where the furniture properties/attributes indicate a temporary furniture and a fixed furniture.

For example, after the cleaning robot obtains the topographic map in which several obstacles are identified, the cleaning robot may classify the obstacles according to the bottom areas of the obstacles. For example, if the bottom area of an obstacle is smaller than or equal to a first preset threshold, the obstacle is determined as a first obstacle. If the bottom area of an obstacle is greater than or equal to a second preset threshold, the obstacle is determined as a second obstacle.

In an example, N first obstacles and M second obstacles are obtained according to the above classification method, where N and M are integers greater than or equal to 0. Because the bottom area of the first obstacle is smaller, the first obstacle may be referred to as a supporting portion of a piece of furniture, such as a table leg, a stool leg or a sofa leg.

According to positions of the N first obstacles, distances among the first obstacles may be obtained, and then a number S pieces of furniture represented by the N first obstacles may be obtained. Because the bottom area of the second obstacle is larger, the second obstacle may be referred to as the floor furniture, such as a floor bed, a floor tea table or a floor stool. According to the bottom areas of the M second obstacles, a number M pieces of furniture represented by the M second obstacles may be obtained.

During initialization, a correspondence relationship between furniture and furniture attributes/properties may be set for the cleaning robot. The correspondence relationship illustrates furniture attributes/properties of different furniture, and the different furniture may be classified into the fixed furniture or the temporary furniture according to the attributes/properties.

After the cleaning robot obtains information about the S+M pieces of furniture placed in the room, the cleaning robot may obtain the furniture attributes/properties of the S+M pieces of furniture according to the correspondence relationship. For example, in a case that the cleaning robot determines that three pieces of furniture including a bed, a large wardrobe and a stool are placed in the room according to the bottom areas of the several obstacles.

As can be learned by querying the correspondence relationship between furniture and furniture attributes/properties, the furniture attributes/properties of the bed and the large wardrobe indicate the fixed furniture, and the furniture attribute/property of the stool indicates the temporary furniture. The cleaning robot may mark unclean regions where the bed and the large wardrobe are placed as fixed regions and scan the unclean region where the stool is placed at every preset time interval.

According to some embodiments of the present disclosure, the attribute/property of the obstacle may be determined according to a correspondence relationship between furniture and furniture attributes/properties, thereby improving convenience and accuracy of determination of the furniture property.

In some applications, the method may be implemented by a terminal. The terminal may be a phone, a tablet computer, a smart watch or other device that is capable of connecting with the cleaning robot, which is not limited herein. The terminal may be connected with the cleaning robot through infrared, Bluetooth or wireless communication networks.

After the cleaning robot obtains the topographic map, the cleaning robot may send the topographic map to the terminal. The terminal can determine the unclean region in the cleaning region, wherein the unclean region is occupied by the obstacle and thus is unable to be cleaned, according to the topographic map. The terminal can then generate a first operation instruction and send the first operation instruction to the cleaning robot. The first operation instruction instructs the cleaning robot to detect the unclean region according to the preset time interval and clean the unclean region if determining that the obstacle placed on the unclean region is removed.

In some other embodiments, after the terminal receives from the cleaning robot the topographic map in which several obstacles are identified, the terminal marks the regions which are occupied by the obstacles and are unable to be cleaned as unclean regions, i.e., several unclean regions are determined according to the topographic map. Next, the terminal determines in turn whether the obstacle placed at each unclean region is a piece of temporary furniture to thereby obtain a determination result, and generates a second operation instruction according to the determination result.

The terminal can then send the second operation instruction to the cleaning robot. The second operation instruction instructs the cleaning robot to scan the unclean region where the temporary furniture is placed according to the preset time interval. Specifically, the terminal may determine whether the obstacle placed on each unclean region is a piece of temporary furniture according to the user's settings, according to the bottom area of the obstacle, or according to the furniture represented by the obstacle, which are not limited herein.

Hereinafter, implementation processes will be described in details with reference to several examples.

Figure 2:
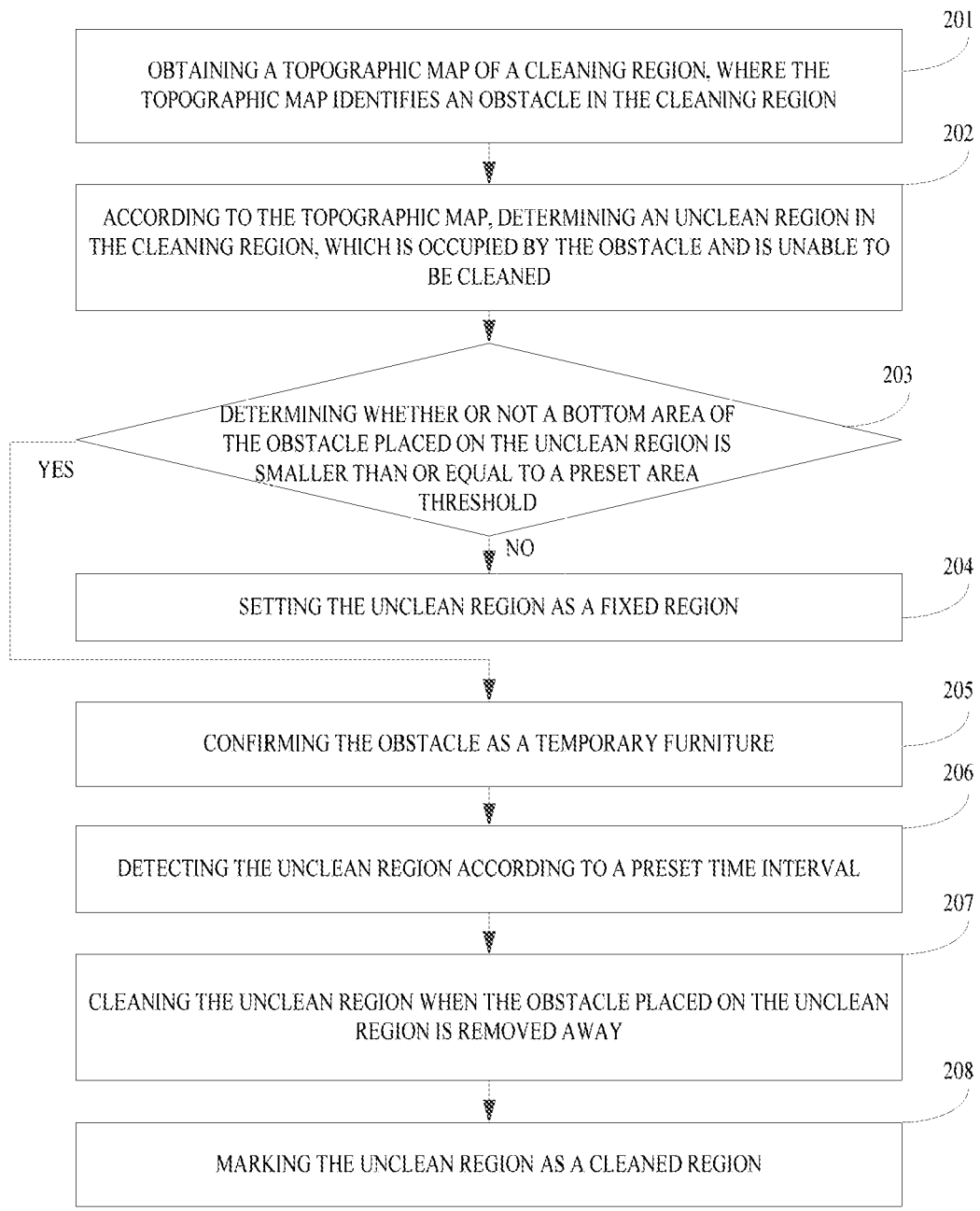
FIG. 2 is a flowchart illustrating a timed cleaning method according to some embodiments.

FIG. 2 is a flowchart illustrating a timed cleaning method according to some embodiments, and this method may be implemented by a cleaning robot. As shown in FIG. 2, the method includes the following steps 201 to 208.

Step 201 can include obtaining a topographic map of a cleaning region, where the topographic map identifies an obstacle in the cleaning region, and performing the step 202.

Step 202 can include, according to the topographic map, determining an unclean region in the cleaning region, wherein the unclean region is occupied by the obstacle and is unable to be cleaned, and performing step 203.

Step 203 can include, determining whether or not a bottom area of the obstacle placed on the unclean region is smaller than or equal to a preset area threshold; if the bottom area of the obstacle is greater than the preset area threshold, performing step 204; if the bottom area of the obstacle is smaller than or equal to the preset area threshold, performing step 205.

Step 204 can include setting the unclean region as a fixed region and ending the process.

Step 205 can include confirming the obstacle as a temporary furniture, and performing step 206.

Step 206 can include detecting the unclean region according to a preset time interval, and performing step 207.

Step 207 can include cleaning the unclean region when the obstacle placed on the unclean region is removed away, and performing step 208.

Step 208 can including marking the unclean region as a cleaned region.

According to the timed cleaning method of this embodiment of the present disclosure, when encountering an obstacle in a region in the process of cleaning, the region may be marked as an unclean region, and then the unclean region is scanned regularly. If it is determined that the obstacle is moved away, the unclean region previously occupied by the obstacle is cleaned, thereby increasing flexibility in cleaning the room, ensuring the cleaning quality and then improving user experience.

Figure 3:
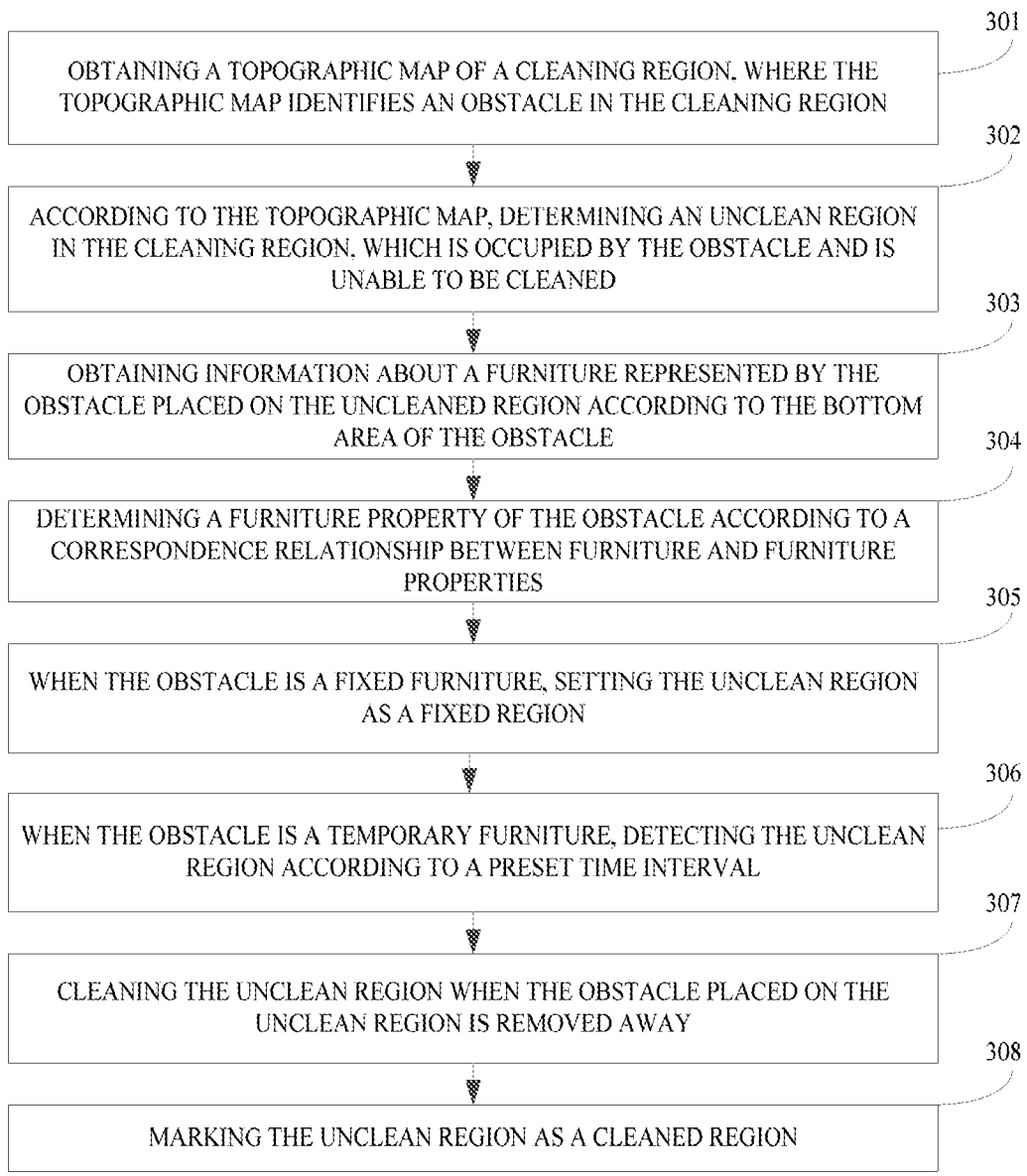
FIG. 3 is a flowchart illustrating a timed cleaning method according to some embodiments.

FIG. 3 is a flowchart illustrating a timed cleaning method according to some embodiments, and this method may be implemented by a cleaning robot. As shown in FIG. 3, the method includes the following steps 301 to 308.

Step 301 can include obtaining a topographic map of a cleaning region, where the topographic map identifies an obstacle in the cleaning region, and performing step 302.

Step 302 can include, according to the topographic map, determining an unclean region in the cleaning region, which is occupied by the obstacle and is unable to be cleaned, and performing step 303.

Step 303 can include obtaining information about a piece of furniture represented by the obstacle placed on the uncleaned region according to the bottom area of the obstacle, and performing step 304.

Step 304 can include determining a furniture property of the obstacle according to a correspondence relationship between furniture and furniture attributes/properties, and performing step 305.

Step 305 can include, if the obstacle is a piece of fixed furniture, setting the unclean region as a fixed region and end the process.

Step 306 can include, if the obstacle is a temporary furniture, detecting the unclean region according to a preset time interval, and performing the step 307.

Step 307 can include cleaning the unclean region when the obstacle placed on the unclean region is removed, and performing step 308.

Step 308 can include marking the unclean region as a cleaned region.

According to the timed cleaning method of this embodiment of the present disclosure, when encountering an obstacle in a region in the process of cleaning, the region may be marked as an unclean region, and then the unclean region is scanned regularly. If it is determined through the scan that the obstacle is removed, the unclean region occupied by the obstacle is cleaned, thereby increasing flexibility in cleaning the room, ensuring the cleaning quality and then improving user experience.

Hereinafter, device embodiments of the present disclosure are described and may be used to implement the method embodiments of the present disclosure.

Figure 4A:
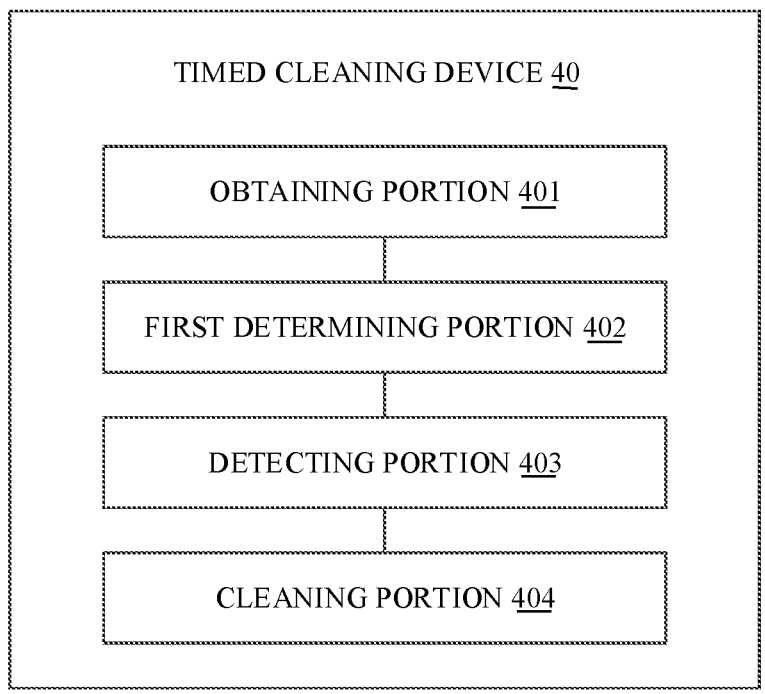
FIG. 4A is a schematic diagram illustrating a structure of a timed cleaning device according to some embodiments.

FIG. 4A is a schematic diagram illustrating a structure of a timed cleaning device 40 according to some embodiments. The device 40 may be implemented as part or all of an electronic apparatus through software, hardware or a combination thereof. As shown in FIG. 4A, the timed cleaning device 40 includes an obtaining portion 401, a first determining portion 402, a detecting portion 403 and a cleaning portion 404.

The obtaining portion 401 is configured to obtain a topographic map of a cleaning region, where the topographic map identifies an obstacle in the cleaning region.

The first determining portion 402 is configured to, according to the topographic map, determine an unclean region in the cleaning region, which is occupied by the obstacle and is unable to be cleaned.

The detecting portion 403 is configured to detect/scan the unclean region according to a preset time interval.

The cleaning portion 404 is configured to, when detecting that the obstacle placed on the unclean region is removed, clean the unclean region.

Figure 4B:
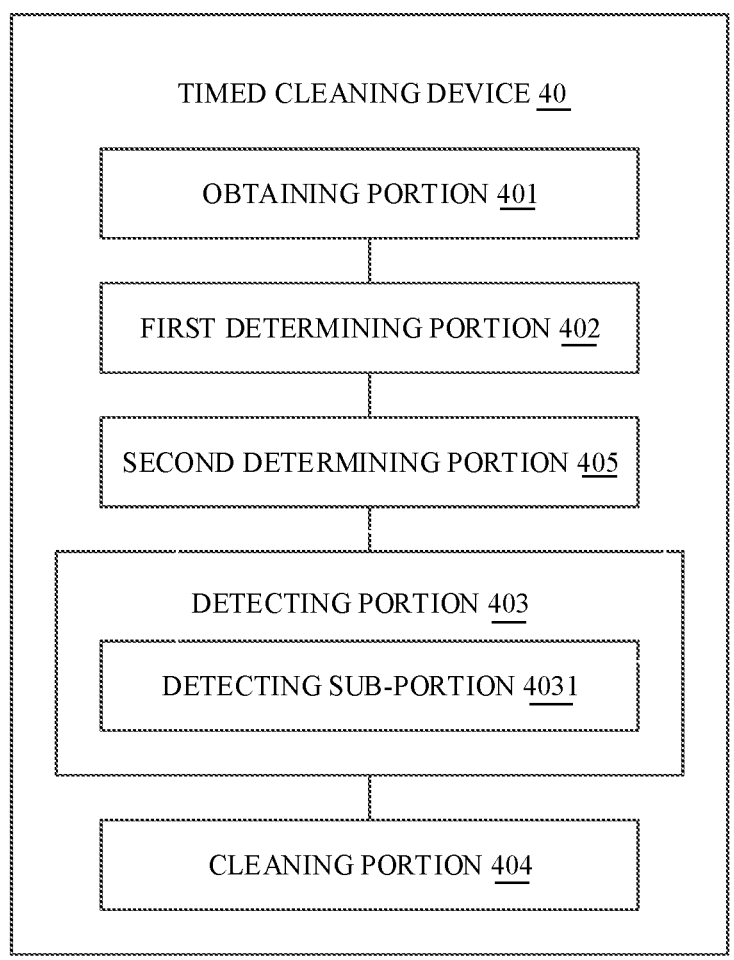
FIG. 4B is a schematic diagram illustrating a structure of a timed cleaning device according to some embodiments.

In some embodiments, as shown in FIG. 4B, the device 40 further includes a second determining portion 405, and the detecting portion 403 includes a detecting sub-portion 4031.

The second determining portion 405 is configured to determine whether the obstacle is a piece of temporary furniture based on the bottom area of the obstacle.

The detecting sub-portion 4031 is configured to, when the obstacle is a piece of temporary furniture, detect/scan the unclean region according to the preset time interval.

Figure 4C:
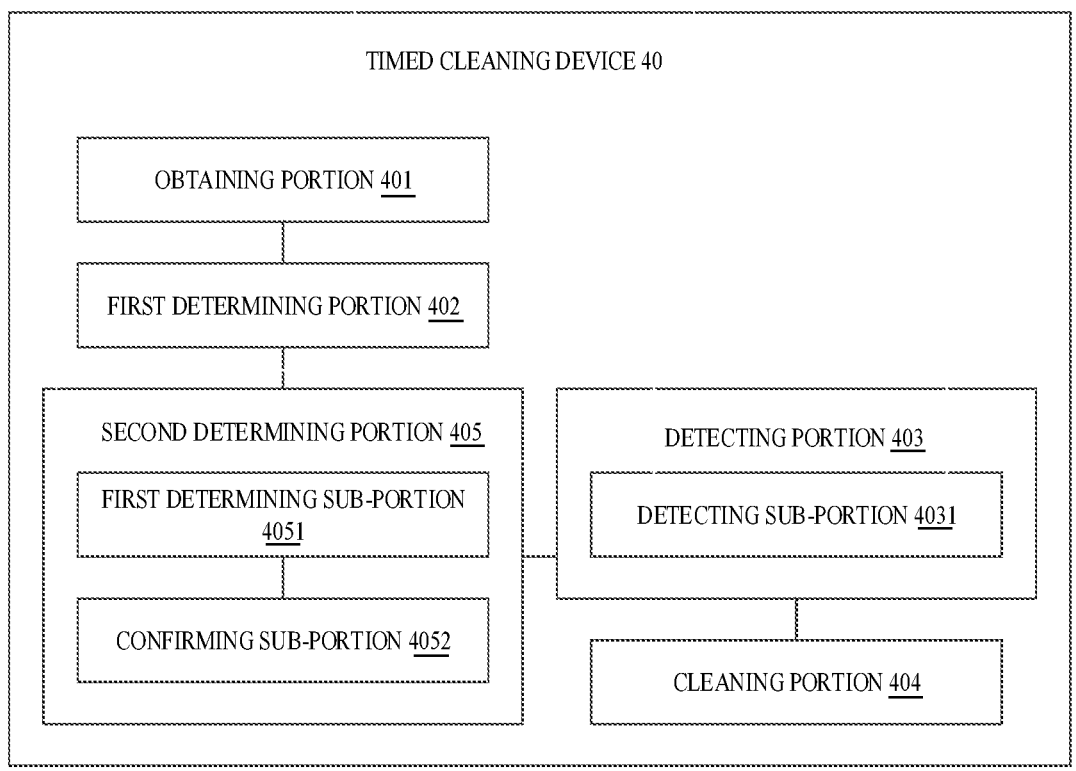
FIG. 4C is a schematic diagram illustrating a structure of a timed cleaning device according to some embodiments.

In one embodiment, as shown in FIG. 4C, the second determining portion 405 includes a first determining sub-portion 4051 and a confirming sub-portion 4052.

The first determining sub-portion 4051 is configured to determine whether or not the bottom area of the obstacle is smaller than or equal to a preset area threshold.

The confirming sub-portion 4052 is configured to, if the bottom area of the obstacle is smaller than or equal to the preset area threshold, confirm the obstacle as a piece of temporary furniture.

Figure 4D:
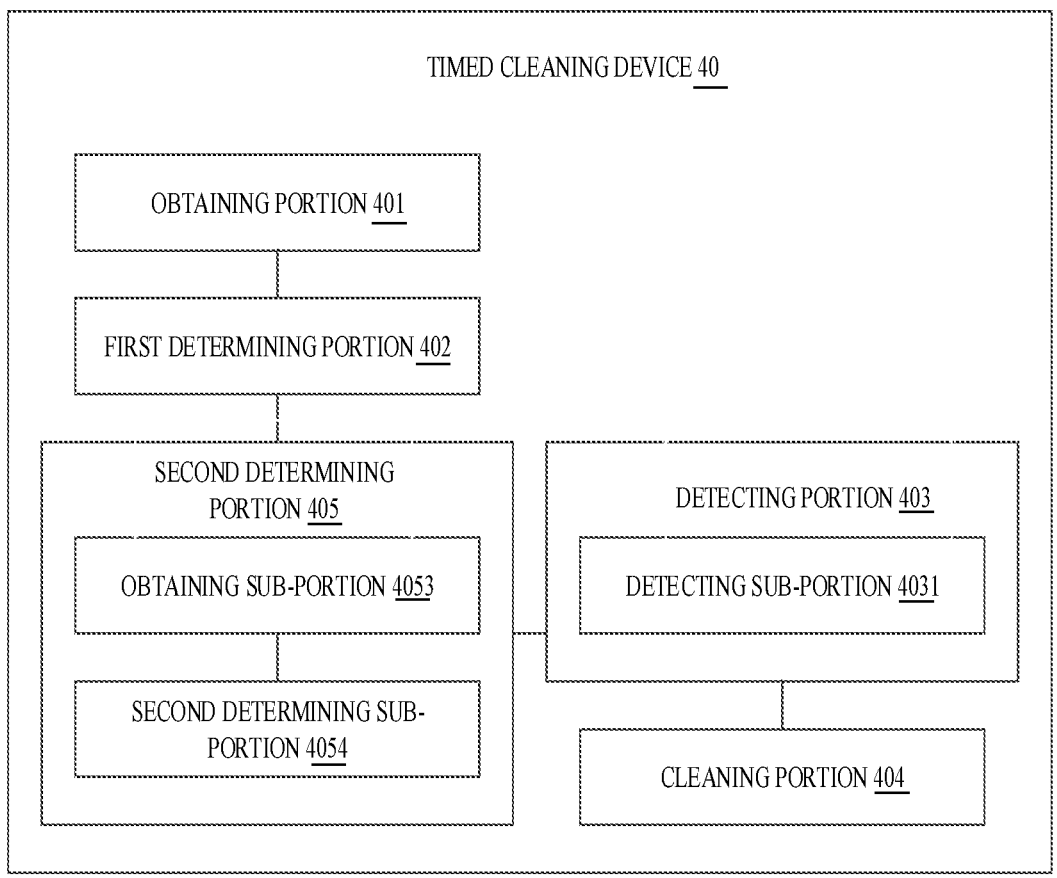
FIG. 4D is a schematic diagram illustrating a structure of a timed cleaning device according to some embodiments.

In some embodiments, as shown in FIG. 4D, the second determining portion 405 includes an obtaining sub-portion 4053 and a second determining sub-portion 4054.

The obtaining sub-portion 4053 is configured to obtain information about a piece of furniture represented by the obstacle based on the bottom area of the obstacle.

The second determining sub-portion 4054 is configured to determine a property/attribute of the obstacle according to a correspondence relationship between furniture and furniture properties/attributes, where the furniture properties/attributes indicate a temporary furniture and a fixed furniture.

Figure 4E:
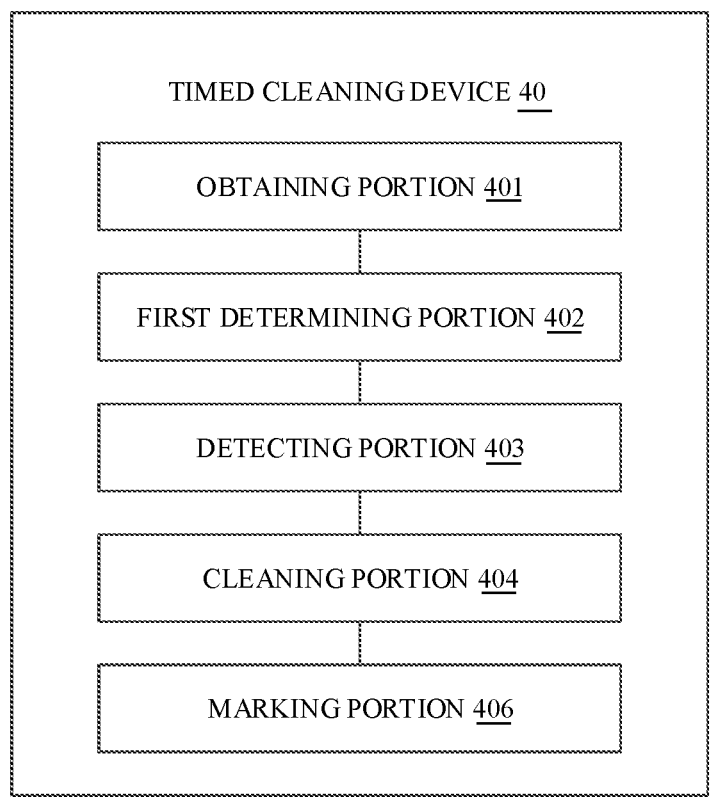
FIG. 4E is a schematic diagram illustrating a structure of a timed cleaning device according to some embodiments.

In some embodiments, as shown in FIG. 4E, the device 40 further includes a marking portion 406. The marking portion 406 is configured to, after the unclean region has been cleaned, mark the unclean region as a cleaned region.

According to the timed cleaning device of this embodiment of the present disclosure, when encountering an obstacle in a region in the process of cleaning, the region may be marked as an unclean region, and then the unclean region is detected (also referred to as scanned, sensed, explored, etc.) regularly.

If it is detected that the obstacle is removed, the unclean region previously occupied by the obstacle is cleaned, thereby increasing flexibility in cleaning the room, ensuring the cleaning quality and then improving user experience.

According to some embodiments, a timed cleaning device is provided, including:

a processor, and memory storing instructions executable by the processor.

The processor is configured to:

obtain a topographic map of a cleaning region, where the topographic map identifies an obstacle in the cleaning region;

according to the topographic map, determine an unclean region in the cleaning region, which is occupied by the obstacle and is unable to be cleaned;

detect the unclean region according to a preset time interval; and if detecting that the obstacle placed on the unclean region is removed, clean the unclean region.

In some embodiments, the processor is further configured to determine whether the obstacle is a piece of temporary furniture based on the bottom area of the obstacle; and if the obstacle is the temporary furniture, scan the unclean region according to the preset time interval.

In some embodiments, the processor is further configured to determine whether or not the bottom area of the obstacle is smaller than or equal to a preset area threshold; and if the bottom area of the obstacle is smaller than or equal to the preset area threshold, confirm the obstacle as a piece of temporary furniture.

In some embodiments, the processor is further configured to obtain information about a piece of furniture represented by the obstacle according to the bottom area of the obstacle; and determine a furniture property (also referred to as attribute) of the obstacle according to a correspondence relationship between furniture and furniture properties/attributes, where the furniture properties/attributes indicate the furniture being temporary or fixed.

In some embodiments, the processor is further configured to, after the unclean region has been cleaned, mark the unclean region as a cleaned region.

According to some embodiments of the present disclosure, when encountering an obstacle in a region in the process of cleaning, the region may be marked as an unclean region, and then the unclean region is detected/scanned regularly. If it is detected that the obstacle is removed away, the unclean region previously occupied by the obstacle is cleaned, thereby increasing flexibility in cleaning the room, ensuring the cleaning quality and then improving user experience.

With respect to the device in the above embodiments, the specific manners for performing operations in individual portions therein have been described in detail in the embodiments regarding the related methods and will not be elaborated herein.

Figure 5:
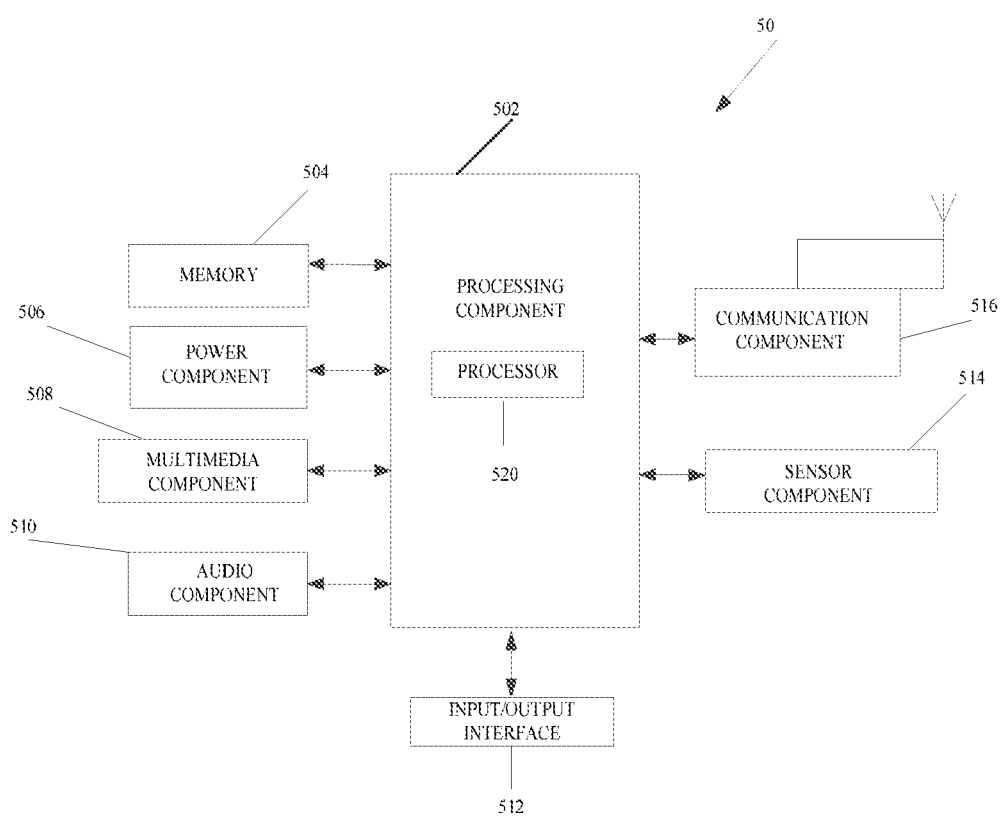
FIG. 5 is a block diagram illustrating a structure of a timed cleaning device according to some embodiments.

FIG. 5 is a block diagram illustrating a structure of a terminal device 50 according to some embodiments, and the terminal device 50 may be applied with, or be part of, the timed cleaning device or system 40. For example, the terminal device 50 may be a mobile phone, a message transceiver, a tablet computer, smart home appliances or the like.

The device 50 may include one or more of the following components: a processing component 502, a memory 504, a power component 506, a multimedia component 508, an audio component 510, an input/output (I/O) interface 512, a sensor component 514 and a communication component 516. The phrase "components" may be interchangeably used with "portions," "modules (if in a modular form), etc.

The processing component 502 typically controls overall operations of the device 50, such as the operations associated with display, phone calls, data communications, camera operations and recording operations. The processing component 502 may include one or more processors 520 to execute instructions to perform all or part of the steps in the above described methods. Moreover, the processing component 502 may include one or more portions configured to facilitate the interaction between the processing component 502 and other components. For example, the processing component 502 may include a multimedia portion to facilitate interactions between the multimedia component 508 and the processing component 502.

Memory 504 is configured to store various types of data to support operations of the device 50. Examples of such data include instructions for any applications or methods operated on the device 50, contact data, phonebook data, messages, pictures, video, etc. Memory 504 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Power component 506 provides power to various components of the device 50. The power component 506 may include a power supply management system, one or more power sources, and any other components associated with the generation, management, and distribution of power in the device 50.

The multimedia component 508 includes a screen providing an output interface between the device 50 and the user. In some embodiments, the screen may include a liquid crystal display (LCD) or other types of displays, and a touch panel (TP).

If the screen includes the touch panel, the screen may be implemented as a touch screen to receive input signals from the user. The touch panel includes one or more touch sensors to sense touches, swipes and gestures on the touch panel. The touch sensors not only can sense a boundary of a touch or swipe action, but also can sense a period of time and a pressure associated with the touch or swipe action.

In some embodiments, the multimedia component 508 includes a front camera and/or a rear camera. The front camera and/or the rear camera may receive an external multimedia datum while the device 50 is in an operation mode, such as a photographing mode or a video mode. Each of the front camera or the rear camera may be a fixed optical lens system or have focus and optical zoom capability.

The audio component 510 is configured to output and/or input audio signals. For example, the audio component 510 includes a microphone (MIC) configured to receive an external audio signal when the device 50 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface portions, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 50. For instance, the sensor component 514 may detect an open/closed status of the device 50, relative positioning of components, e.g., the display and the keypad, of the device 50, a change in position of the device 50 or a component of the device 50, a presence or absence of user's contact with the device 50, an orientation or an acceleration/deceleration of the device 50, and a change in temperature of the device 50.

The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor or a temperature sensor.

The communication component 516 is configured to facilitate communication, wired or wirelessly, between the device 50 and other devices. The device 50 can access a wireless network based on a communication standard, such as Bluetooth, radio frequency (RF), infrared, WiFi, 2G, 3G, 4G, 5G, or a combination thereof.

In some embodiments, the communication component 516 receives a broadcast signal or broadcast associated information from an external broadcast management system via a broadcast channel. In some embodiments, the communication component 516 further includes a near field communication (NFC) portion to facilitate short-range communications. For example, the NFC portion may be implemented based on a radio frequency identification (RFID) technology, an infrared data association (IrDA) technology, an ultra-wideband (UWB) technology, a Bluetooth (BT) technology, and other technologies.

In some embodiments, the device 50 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In some embodiments, there is also provided a non-transitory computer-readable storage medium including instructions, such as included in the memory 504, executable by the processor 520 in the device 50, for performing the above-described methods. For example, the non-transitory computer-readable storage medium may be a ROM, a RAM, a CD-ROM, a magnetic tape, a floppy disc, an optical data storage device, and the like.

In some embodiments, there is also provided a non-transitory computer-readable storage medium having instructions stored thereon, executable by the processor in the device 50, for performing the above-described timed cleaning methods. The method includes:

obtaining a topographic map of a cleaning region, where the topographic map identifies an obstacle in the cleaning region;

based on the topographic map, determining an unclean region in the cleaning region, which is occupied by the obstacle and is unable to be cleaned;

detecting the unclean region according to a preset time interval; and when detecting that the obstacle placed on the unclean region is removed, cleaning the unclean region.

In some embodiments, the method further includes determining whether the obstacle is a temporary obstacle based on the bottom area of the obstacle; and detecting the unclean region according to a preset time interval including: if the obstacle is temporary, detecting the unclean region according to the preset time interval.

In some embodiments, determining whether the obstacle is temporary based on the bottom area of the obstacle includes: determining whether or not the bottom area of the obstacle is smaller than or equal to a preset area threshold; if the bottom area of the obstacle is smaller than or equal to the preset area threshold, confirming the obstacle as temporary.

In some embodiments, determining whether the obstacle is temporary based on the bottom area of the obstacle includes: obtaining information about the obstacle represented by the obstacle according to the bottom area of the obstacle; and determining a property/attribute of the obstacle according to a correspondence relationship between obstacles and obstacle properties/attributes, where the obstacle properties/attributes indicate whether the obstacles are temporary or fixed.

In some embodiments, the method further includes: after the unclean region has been cleaned, marking the unclean region as a cleaned region.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the timed cleaning device, to direct the timed cleaning device to move to desired target areas, or to perform desired operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

In some embodiments, a touch screen (not shown) is included on the timed cleaning device allowing user input to control the timed cleaning device directly. In the case of a large home, a hotel or office space cleaning, one or more robotic cleaning devices 40 can be integrally implemented in the system to clean the hotel or the office, based on obstacles locations, user preferences, etc. In some embodiments, the plurality of robotic cleaning devices can "talk" to each other, and perform cleaning in a collaborative, coordinated, collective or self-organized manner, and realize artificial intelligence (AI) based cleaning operations.

For example, when an obstacle is detected and marked by one robotic cleaning device 40, one or more other robotic cleaning devices 40 can come back at a later time or based on a predetermined time interval sequence to further detect whether the unclean region underneath the obstacle has become available for cleaning and, if so, perform the cleaning of the unclean region after the obstacle is removed.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A timed cleaning method, implemented by a cleaning robot, comprising:

obtaining, with one or more sensors mounted on the cleaning robot, a topographic map of a cleaning region, wherein the topographic map identifies an obstacle in the cleaning region;

based on the topographic map, determining, with a processor of the cleaning robot, an unclean region in the cleaning region, wherein the unclean region is occupied by the obstacle;

detecting, with the one or more sensors, the unclean region according to a preset time interval;

responsive to that the obstacle at the unclean region is removed, cleaning, with the cleaning robot, the unclean region;

determining, with the processor, whether the obstacle is temporary based on a bottom area of the obstacle;

wherein the detecting, with the one or more sensors, the unclean region according to the preset time interval comprises:

responsive to that the obstacle is temporary, detecting, with the one or more sensors, the unclean region according to the preset time interval.

2. The method of claim 1, wherein the determining, with the processor, whether the obstacle is temporary based on the bottom area of the obstacle comprises:

determining whether or not the bottom area of the obstacle is smaller than or equal to a preset area threshold; and responsive to that the bottom area of the obstacle is smaller than or equal to the preset area threshold, confirming the obstacle as the temporary.

3. The method of claim 1, wherein the determining, with the processor, whether the obstacle is temporary based on the bottom area of the obstacle comprises:

obtaining, with the one or more sensors, information about the obstacle according to the bottom area of the obstacle based on a size of the cleaning robot; and determining, with the processor, an attribute of the obstacle according to a correspondence relationship between obstacles and obstacle attributes, wherein the obstacle attributes indicate whether the obstacles are temporary or fixed.

4. The method of claim 1, further comprising:
after the unclean region has been cleaned, marking, with the processor, in the topographic map, the unclean region as a cleaned region.

5. The method of claim 1, further comprising:
after the unclean region has been cleaned, marking, with the processor, in the topographic map, the unclean region as a cleaned region.

6. The method of claim 2, further comprising:
after the unclean region has been cleaned, marking, with the processor, in the topographic map, the unclean region as a cleaned region.

7. The method of claim 3, further comprising:
after the unclean region has been cleaned, marking, with the processor, in the topographic map, the unclean region as a cleaned region.

8. A timed cleaning robot, comprising:
a processor,
one or more sensors; and
a memory device configured to store a set of instructions executable by the processor,
wherein the processor is configured, based on the instructions, to:

control obtaining, with the one or more sensors, a topographic map of a cleaning region, where the topographic map identifies an obstacle in the cleaning region;

based on the topographic map, determine, with the processor, an unclean region in the cleaning region, wherein the unclean region is occupied by the obstacle;

control detecting, with the one or more sensors, the unclean region according to a preset time interval;

responsive to that detecting that the obstacle at the unclean region is removed, control cleaning, with the cleaning robot, the unclean region;

determine whether the obstacle is temporary according to a bottom area of the obstacle; and wherein the detecting, with the one or more sensors, the unclean region according to the preset time interval comprises:

responsive to that the obstacle is the temporary, detecting, with the one or more sensors, the unclean region according to the preset time interval.

9. The cleaning robot of claim 8, wherein the processor is further configured such that the determining whether the obstacle is temporary based on the bottom area of the obstacle comprises:

determining whether or not the bottom area of the obstacle is smaller than or equal to a preset area threshold; and responsive to that the bottom area of the obstacle is smaller than or equal to the preset area threshold, confirming the obstacle as temporary.

10. The cleaning robot of claim 8, wherein the processor is further configured such that the determining whether the obstacle is temporary based on the bottom area of the obstacle comprises:

obtaining information about the obstacle according to the bottom area of the obstacle based on a size of the cleaning robot; and determining an attribute of the obstacle according to a correspondence relationship between obstacles and obstacle attributes, wherein the obstacle attributes indicate whether the obstacles are temporary or fixed.

11. The cleaning robot of claim 8, wherein the processor is further configured to:
after the unclean region has been cleaned, mark the unclean region as a cleaned region in the topographic map.

12. The cleaning robot of claim 8, wherein the processor is further configured to:
after the unclean region has been cleaned, mark the unclean region as a cleaned region in the topographic map.

13. The cleaning robot of claim 9, wherein the processor is further configured to:
after the unclean region has been cleaned, mark the unclean region as a cleaned region in the topographic map.

14. The cleaning robot of claim 10, wherein the processor is further configured to:
after the unclean region has been cleaned, mark the unclean region as a cleaned region in the topographic map.

15. A non-transitory computer-readable storage medium having a set of computer program instructions stored thereon, wherein the computer program instructions are executable by a processor to implement a method for performing a timed cleaning method with a cleaning robot, wherein the method comprises:

obtaining, with one or more sensors mounted on the cleaning robot, a topographic map of a cleaning region, wherein the topographic map identifies an obstacle in the cleaning region;

according to the topographic map, determining, with the processor, an unclean region in the cleaning region, wherein the unclean region is occupied by the obstacle;

detecting, with the one or more sensors, the unclean region according to a preset time interval;

responsive to that the obstacle at the unclean region is removed, cleaning, with the cleaning robot, the unclean region;

determining, with the processor, whether the obstacle is temporary based on a bottom area of the obstacle;

wherein the detecting, with the one or more sensors, the unclean region according to the preset time interval comprises:

responsive to that the obstacle is temporary, detecting, with the one or more sensors, the unclean region according to the preset time interval.

16. The storage medium of claim 15, wherein the determining, with the processor, whether the obstacle is temporary based on the bottom area of the obstacle comprises:

determining, with the processor, whether or not the bottom area of the obstacle is smaller than or equal to a preset area threshold; and responsive to that the bottom area of the obstacle is smaller than or equal to the preset area threshold, confirming, with the processor, the obstacle as temporary.

17. The storage medium of claim 15, wherein the determining, with the processor, whether the obstacle is the temporary based on the bottom area of the obstacle comprises:

obtaining, with the one or more sensors, information about the obstacle according to the bottom area of the obstacle based on a size of the cleaning robot; and determining, with the processor, an attribute of the obstacle according to a correspondence relationship between obstacles and obstacle attributes, wherein the obstacle attributes indicate whether the obstacles are temporary or fixed.

* * * * *